Oct. 3, 1950     A. J. WILHELM     2,524,501
FLOOR DRAIN VALVE
Filed Aug. 29, 1946
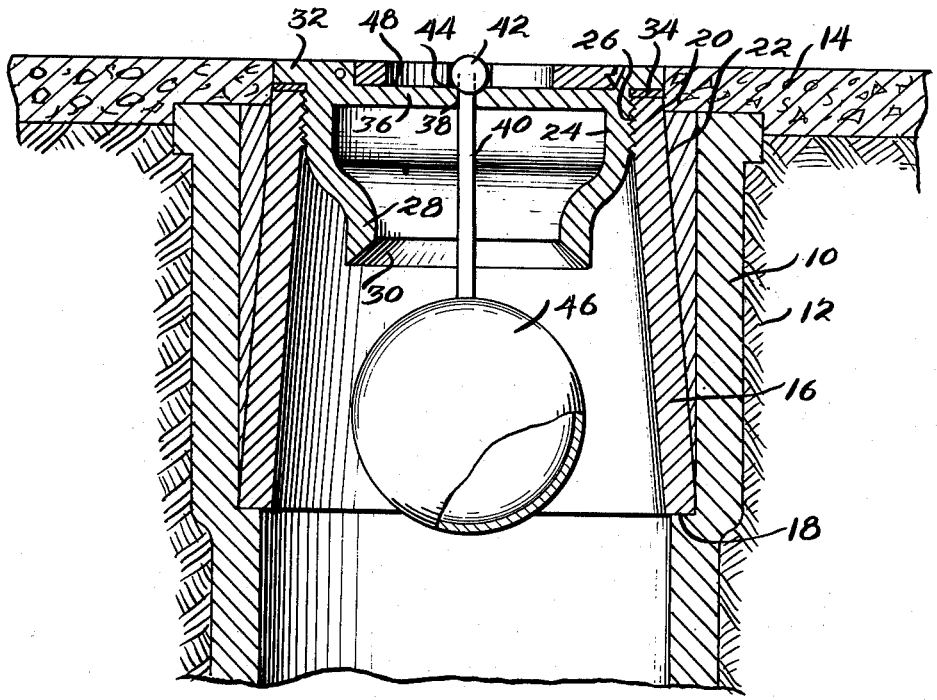
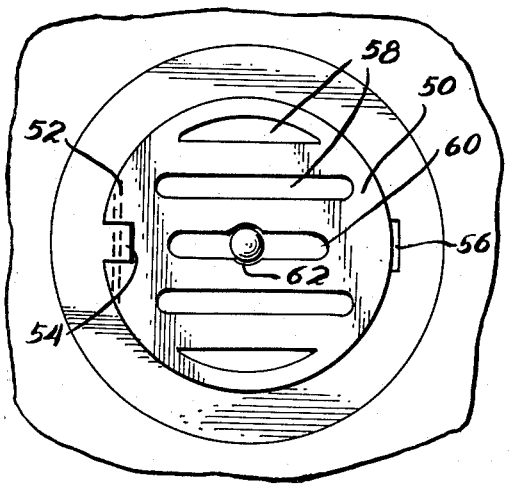 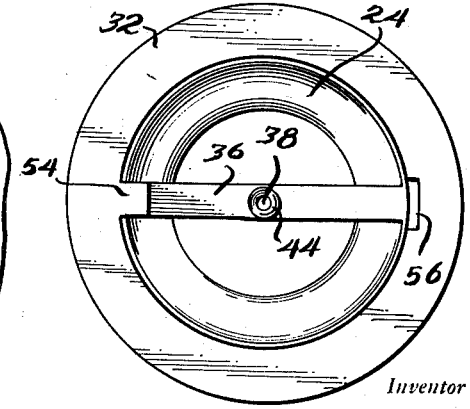
Inventor
Adam J. Wilhelm
By Clarence A. O'Brien
and Harvey B. Jacobson
Attorneys Patented Oct. 3, 1950

2,524,501

UNITED STATES PATENT OFFICE 2,524,501

FLOOR DRAIN VALVE

Adam J. Wilhelm, Regina, Saskatchewan, Canada

Application August 29, 1946, Serial No. 693,663

2 Claims. (Cl. 182—25)

The present invention relates to novel and useful improvements in a floor drain valve and more particularly has reference to a valve attachment which may be removably connected with the floor inlet conduits of a sewer, or basement, or the like, for the purpose of preventing return flow of liquid or gas from said sewer into the cellar.

The principal objects of this invention are to provide a valve for use with sewer inlets or drain pipes opening into cellars or the like, which will efficiently seal the inlet opening of the sewer pipe to thereby prevent escape of liquid or gas from the sewer pipe into the cellar; which may be readily attached to existing sewer pipe conduits; which is adapted to sit flush with the level of a cellar floor; which is composed of relatively few parts; which is so designed as to maintain its valve seat in a clean and unobstructed position; wherein a portion of the valve means also functions as an indicating means for readily denoting the position of the valve of the device; and wherein a manually operable means is disposed exteriorly of the device, for ready engagement by a person, for the purpose of manipulating the valve, for cleaning, removing rust or the like; and which device is withal a reliable and inexpensive construction and may be readily installed and removed by the user.

These, together with various ancillary objects of the invention which will later become apparent as the following description proceeds, are realized by my invention, one embodiment of which has been illustrated, by way of example only, in the attached drawings, wherein:

Figure 1 is a vertical sectional view showing my device installed in a cellar or sewer inlet pipe;

Figure 2 is a top plan view of Figure 1; and,

Figure 3 is a top plan view of Figure 1 with the grating shown in Figure 2, removed therefrom.

Referring now more specifically to the annexed drawings, wherein like numerals indicate similar parts throughout the several views, numeral 10 indicates the upper or inlet end of a sewer inlet conduit and which is embedded in the floor 12 of a cellar, basement or the like. The cement floor 14 of the cellar is adapted to surround and overlie the upper end of the conduit 10, and is adapted to abut a telescopic, conical sleeve 16 which is seated within the conduit 10 and rests upon a shoulder portion 18 of reduced diameter therein, and has its upwardly positioned end of reduced internal diameter and internally threaded as at 20. A suitable caulking or packing means 22 is compressed between the exterior of the conical sleeve 16 and the interior of the sewer conduit 10 for the purpose of providing a gas-tight joint therebetween, which caulking material is retained by the superincumbent cement layer 14. All of the foregoing construction or structure is of known design and is conventional with one type of basement or cellar sewer drain pipe.

In accordance with the dictates of this invention, I replace the usual and conventional trap which is intended to be screwed into the threaded portion 20 of the sleeve 16, with the device according to this disclosure. For this purpose I provide a valve body indicated at 24, and externally threaded as at 26 for engagement with the threads 20. This body is curved and contoured to merge into an annular portion 28 of reduced diameter which is provided upon its lower end surface with a valve seat 30. At its upper end, the body 24 is provided with a flanged or shouldered portion 32 which is adapted to overlie the upper end of the sleeve 16 to fit readily in the aperture into which the sleeve 16 extends, and which provides a fluid tight seal therebetween as by means of a gasket 34 or the like. Spaced inwardly from the upper end of the shoulder 32 is a transverse bar 36 which constitutes a support for a float valve in a manner now to be described.

Centrally of the support valve and axially of the body portion 24 is an aperture 38 which loosely receives therethrough a rod 40 having a headed upper end portion 42 which may preferably be of a ball shape. The upper surface of aperture 38 is countersunk or recessed as at 44 to provide a concave seat upon which the headed portion 42 is firmly supported. At its lower end, the rod 40 is provided with a spherical float 46 which is preferably constructed of a suitable plastic, and whose upper surface constitutes a valve engageable with the valve seat 30. It will thus be seen, that the valve 46 normally clears the seat 30, and is supported by its head 42 in a manner adapted for free oscillation in the aperture 38. When liquid rises to a sufficient height within the inlet 10, the float 46 is lifted with its rod 40 sliding in the guide aperture 38, until the valve portion of the float is seated against the valve seat 30 thereby tightly sealing the conduits 10 and the sleeves 16 against the passage of liquid or gas therefrom. It will, of course, be apparent that as the float 46 is raised, the headed portion 42 is elevated above the surface of the shouldered portion 32 and of the basement floor 14, whereby its elevated position constitutes an indicating means denoting the position of the valve and the presence of liquid above a predetermined level in the conduits 10 and 16.

By means of the swiveling engagement of the head 42 in its seat 44, the float 46 is caused to oscillate as there is a flow of liquid downwardly through the drain, whereby this movement of the valve serves to brush off any accumulation of matter upon the valve seat 30 and to prevent a corrosion thereof, or the formation of obstructions thereon.

As shown best in Figures 1 and 2, the upper, shouldered surface 32 of the valve body 24 is axially recessed as at 48, for the reception of a grating member 50 which is hinged as at 52 to an inwardly extending lug 54 of the shouldered portion 32, whereby the grating 50 may be raised or lowered, the cutaway portion 56 providing access to the edge of the grating for this purpose. As shown best at Figure 2, the surface of the grating is provided with a plurality of parallel slots 58, the central slot 60 being cut away as at 62 for loosely receiving and recessing the headed portion 42.

I desire to point out that by means of this invention, an occupant of a house may readily attach a control valve to prevent back flow through the cellar sewer drain, which device may be readily removed by the user and installed in a new location as desired.

I claim as my invention:

1. A sewer drain valve including a valve body engaging a sewer inlet pipe and adapted to replace the conventional inlet grating thereof, the lower end of said valve body being of reduced diameter and provided with an annular, inwardly bevelled surface at its lower end forming a valve seat, the upper end of said body having a flanged shoulder forming a sealing means with the upper end of said sewer inlet pipe, a diametrically disposed valve support carried by the upper end of said valve body and recessed below the upper surface thereof and an oscillatably mounted float valve depending from said support and engageable with said seat when liquid rises to a predetermined height within the sewer inlet pipe, said valve being mounted at the lower end of a depending rod, the said rod extending through an aperture in said support, and said rod being vertically slidable and oscillatable in said aperture, the upper end of said rod having an enlarged head, said aperture having a countersunk recess receiving said head, and a grating resting on said support and having its upper surface flush with the upper surface of the body.

2. A sewer drain valve including a valve body engaging a sewer inlet pipe and adapted to replace the conventional inlet grating thereof, the lower end of said valve body being of reduced diameter and provided with an annular, inwardly bevelled surface at its lower end forming a valve seat, the upper end of said body having a flanged shoulder forming a sealing means with the upper end of said sewer inlet pipe, a narrow strip forming a valve support diametrically carried by the upper end of said valve body and an oscillatably mounted float valve depending from said support and engageable with said seat when liquid rises to a predetermined height within the sewer inlet pipe, said valve being mounted at the lower end of a depending rod, the said rod extending through an aperture in said support, a grating resting on said support and apertured for slidably receiving said rod, and said rod being vertically slidable and oscillatable in said aperture, said rod being extensible above said valve body when said valve is closed and constituting an indicating means for the position of said valve.

ADAM J. WILHELM.

REFERENCES CITED

The following references are of record in the file of this patent:

UNITED STATES PATENTS

| Number | Name | Date |
|---|---|---|
| 576,790 | O'Brien | Feb. 9, 1897 |
| 669,042 | Cotter | Feb. 26, 1901 |
| 1,286,935 | Bythiner et al. | Dec. 10, 1918 |
| 2,003,770 | Goodhart | June 4, 1935 |